(12) United States Patent
Nakajoh (10) Patent No.: US 8,654,100 B2
(45) Date of Patent: Feb. 18, 2014

(54) INPUT DEVICE AND MOBILE TERMINAL (75) Inventor: Fumihiko Nakajoh, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 849 days.

(21) Appl. No.: 12/629,380

(22) Filed: Dec. 2, 2009

(65) Prior Publication Data

US 2010/0134447 A1   Jun. 3, 2010

(30) Foreign Application Priority Data

Dec. 3, 2008  (JP) ................................ 2008-308605

(51) Int. Cl.
*G06F 3/042* (2006.01)
(52) U.S. Cl.
USPC ........................................................ 345/175
(58) Field of Classification Search
None
See application file for complete search history.

(56) References Cited

U.S. PATENT DOCUMENTS

| 6,429,856 | B1 | 8/2002 | Omura et al. | |
|---|---|---|---|---|
| 6,608,619 | B2 | 8/2003 | Omura et al. | |
| 7,111,786 | B2 * | 9/2006 | Schmidt et al. | 235/462.45 |
| 7,464,878 | B2 * | 12/2008 | Schmidt et al. | 235/472.01 |
| 7,611,063 | B2 * | 11/2009 | Wilz et al. | 235/462.45 |
| 7,903,097 | B2 | 3/2011 | Watari | |
| 7,924,421 | B2 * | 4/2011 | Schmidt et al. | 356/239.4 |

FOREIGN PATENT DOCUMENTS

| JP | 05-087636 U | 11/1993 |
|---|---|---|
| JP | 10-187331 A | 7/1998 |
| JP | 2000-105671 A | 4/2000 |
| JP | 2005-529395 A | 9/2005 |
| JP | 2007-065767 A | 3/2007 |
| JP | 2007-531146 A | 11/2007 |
| JP | 2008-250897 A | 10/2008 |

OTHER PUBLICATIONS

JP Office Action mailed on May 29, 2012 as received in related application No. 2008-308605.

* cited by examiner

*Primary Examiner* — K. Wong (74) *Attorney, Agent, or Firm* — Maschoff Brennan (57) ABSTRACT

An input device detects a position of an object in relation to a display by using the light emitting elements and light receiving elements. When the high accuracy is not required for the position detection, at least one of the light emitting elements and the light receiving elements is turned off.

19 Claims, 11 Drawing Sheets

INPUT DEVICE AND MOBILE TERMINAL

CROSS-REFERENCE TO RELATED APPLICATION

The present invention claims the benefit of priority under 35 USC 119 of Japanese Patent Application No. 2008-308605, filed on Dec. 3, 2008, the entire contents of which are incorporated herein by reference.

BACKGROUND

1. Technical Field

The present invention relates to an input device which detects a position of an object as an input position.

2. Related Art

When a user carries out an input into an information processing apparatus, an input interface, such as a keyboard, a numeric keypad, or a mouse, is used. A pointing device for operating a pointer displayed on a display is known as one kind of input interface. Although the mouse is a typical pointing device, there is a drawback in that, from a standpoint of size and weight, it is not suitable for a portable information processing apparatus (for example, a portable telephone, a personal digital assistant (PDA), or a mobile personal computer (PC)). Meanwhile, a touch panel is attracting attention as a pointing device with greater portability. A user can carry out an operation to a device with a touch panel, such as a selection of a graphical user interface (an icon, a button, a menu, a checkbox, or the like), by bringing an object, such as a finger or a pen device (a stylus), into contact with a desired area on the display.

Also, a three-dimensional input device which detects the three-dimensional position of the object in relation to the display and utilizes the position as an input, is known. A computer navigation described in Japanese Patent Publication of Unexamined Applications (Kokai) No. 2005-529395 extrapolates the three-dimensional position of the object in relation to the display, based on an area and elliptic eccentricity of a conical infrared light radiated from a leading extremity of the object and falling incident on the display.

With a control device described in Japanese Patent Publication of Unexamined Applications (Kokai) No. 2007-531146, an electromagnetic radiation beam radiated from the leading extremity of the object onto the display is detected by multiple detectors provided on at least one edge of the display. Since the electromagnetic radiation beam attenuates before reaching the detectors from a collision position on the display, the control extrapolates the distance and angle to the display, which is the position, based on the strength of the radiation beam detected by the multiple detectors.

SUMMARY

With the previously described input method, accuracy of input position detection is important. For example, in a kind of case in which the user has to select one from among icons displayed small, and close together, on a display mounted on a portable information processing apparatus, a high detection accuracy is required of the input device. In order to increase the detection accuracy in the input device based on the reflected light method or the transmitted light method, more light emitting elements and light receiving elements are necessary and these elements are disposed closely. That is, in order to obtain a high detection accuracy, more electrical power is necessary to use more light emitting elements and light receiving elements.

Meanwhile, the high detection accuracy is not always needed. For example, a screen saver can be deactivated when the input device detects that there has been some kind of input. That is, the detection accuracy required of the three-dimensional input device not being uniform, it may fluctuate depending on a variety of factors, such as the kind of input carried out by the user, or an operational condition of the information processing apparatus. If it is possible to dynamically adjust the detection accuracy in accordance with the detection accuracy required of the input device, wasteful power consumption could be avoided. In Japanese Patent Publication of Unexamined Applications (Kokai) Nos. 2005-529395 and 2007-531146, there is no consideration given to the required detection accuracy fluctuating, and also, there is no description nor suggestion of a specific configuration for adjusting the detection accuracy in accordance with the fluctuation.

An input device includes: a light emitting unit including multiple light emitting elements disposed on the periphery of an input area, said light emitting elements emit an inspection beam; a light receiving unit including multiple light receiving elements disposed on the periphery of the input area, said light receiving elements receive the inspection beam; a detecting unit to detect a position of an object in relation to the input area based on the inspection beam received by the light receiving unit; and a control unit to control at least one of the light emitting elements and the light receiving elements to turn on or off based on the detection accuracy which is required by the detecting unit.

A mobile terminal includes: a display means for displaying information; a light emitting means for radiating an inspection beam; a light receiving means for receiving the inspection beam; detecting means for detecting a three-dimensional position of an object in relation to the display means based on strength of inspection beam received by the light receiving means; and controlling means for controlling at least one of the light emitting means and the light receiving means to turn on or off based on the detection accuracy which is required by the detecting means.

BRIEF DESCRIPTION OF THE DRAWINGS

Embodiments of the present invention will be described in detail based on the following figures, wherein.

DETAILED DESCRIPTION OF THE INVENTION

Hereafter, referring to the drawings, a description will be given of embodiments of the invention.

First Embodiment

Figure 1:
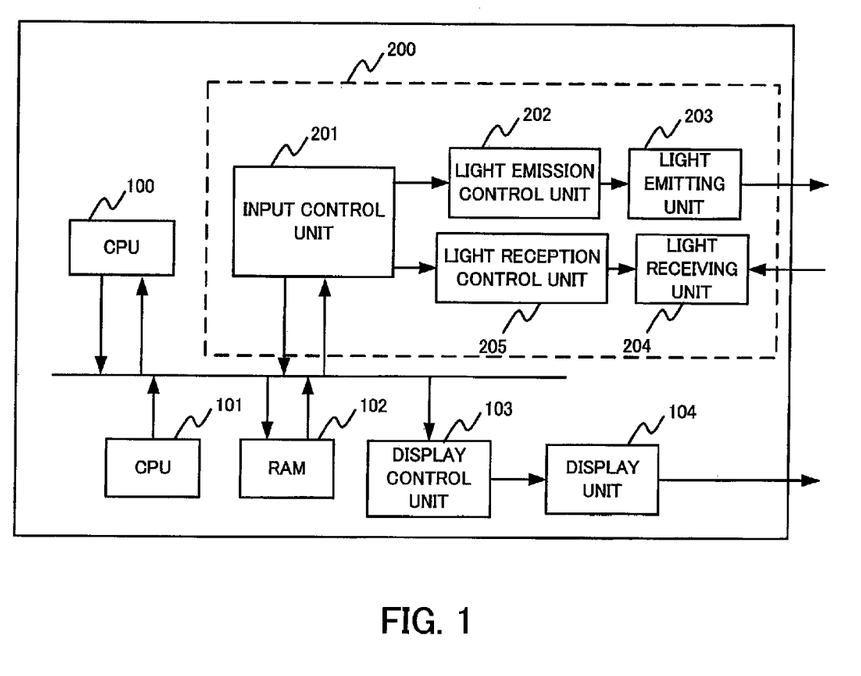
FIG. 1 is a block diagram showing an information processing apparatus on which is mounted an input device according to a first embodiment of the invention.

As shown in FIG. 1, an information processing apparatus, such as a portable telephone or data terminal, in which is mounted an input device 200 according to a first embodiment of the invention, includes a central processing unit (CPU) 100, a read only memory (ROM) 101, a random access memory (RAM) 102, a display control unit 103, and a display unit 104.

The CPU 100 centrally controls each unit of the information processing apparatus. For example, the CPU 100 exchanges data with each unit of the information processing apparatus shown in FIG. 1, and carries out a predetermined computation using the data exchanged.

The ROM 101 stores control program to be executed by the CPU 100, display data to be displayed in the display unit 104, and the like. The RAM 102 stores control data, and the like, retrieved or written during an execution of the control program by the CPU 100 are saved in the RAM 102.

The display unit 104 displays such as characters or images. The display unit 104 is configured of a display such as a liquid crystal display (LCD), or organic light-emitting diode (OLED) display. Multiple light emitting elements and light receiving elements, to be described hereafter, are disposed on its periphery. The display control unit 103 controls the display unit 104 in such a way that it displays details instructed by the CPU 100.

The input device 200 is a three-dimensional input device which detects a three-dimensional position of an object (for example, a user's finger) 300 in relation to the display unit 104. Three-dimensional position data detected by the input device 200 are input into the CPU 100.

The input device 200 includes an input control unit 201, a light emission control unit 202, the light emitting unit 203, the light receiving unit 204, and a light reception control unit 205.

The input control unit 201 centrally controls the light emission control unit 202 and light reception control unit 205. The light emission control unit 202 controls the light emitting unit 203. The light emitting unit 203 includes multiple light emitting elements. For example, the light emission control unit 202, in accordance with an instruction from the input control unit 201, turns on a portion of the light emitting elements while turning off the others, turns them all on, or turns them all off. Switching between the turning on and turning off of the light emitting element is realized by, for example, controlling a supply of a driving power to the relevant light emitting unit 203. Also, it is acceptable that the light emission control unit 202 controls the light emitting unit 203 to reduce the light strength of the inspection beam.

The light emitting element being configured of, for example, an infrared LED. Plural light emitting elements are disposed on the periphery of the display unit 104. The light emitting unit 203, in accordance with an instruction from the light emission control unit 202, radiates an inspection beam. The inspection beam radiated from the light emitting unit 203 is diffracted, intercepted, or reflected by the object 300.

The light receiving unit 204 includes multiple light receiving elements. The light receiving element is configured of, for example, a photodiode. Plural light receiving elements are disposed on the periphery of the display unit 104. The light receiving unit 204 notifies the light reception control unit 205 of a received light strength.

The light reception control unit 205 controls the light receiving unit 204. For example, the light reception control unit 205, based on the received light strength notified of by each light receiving unit 204, detects the three-dimensional position of the object 300 in relation to the display unit 104. The light reception control unit 205 inputs the detected three-dimensional position data into the input control unit 201. Also, the light reception control unit 205, in accordance with an instruction from the input control unit 201, turns on one portion of the light receiving elements while turning off the other light receiving elements, turns them all on, or turns them all off. Switching between turning on and turning off of the light receiving element is realized by, for example, in the event that the light receiving element is power driven, controlling a supply of a driving power to the relevant light receiving element. Also, it is acceptable that the light reception control unit 205 simply discards a received light strength notified of by a light receiving unit 204 which is turned off. By discarding the received light strength notified of, it is possible to reduce an amount of computation necessary for a detection of an input position.

Figure 2:
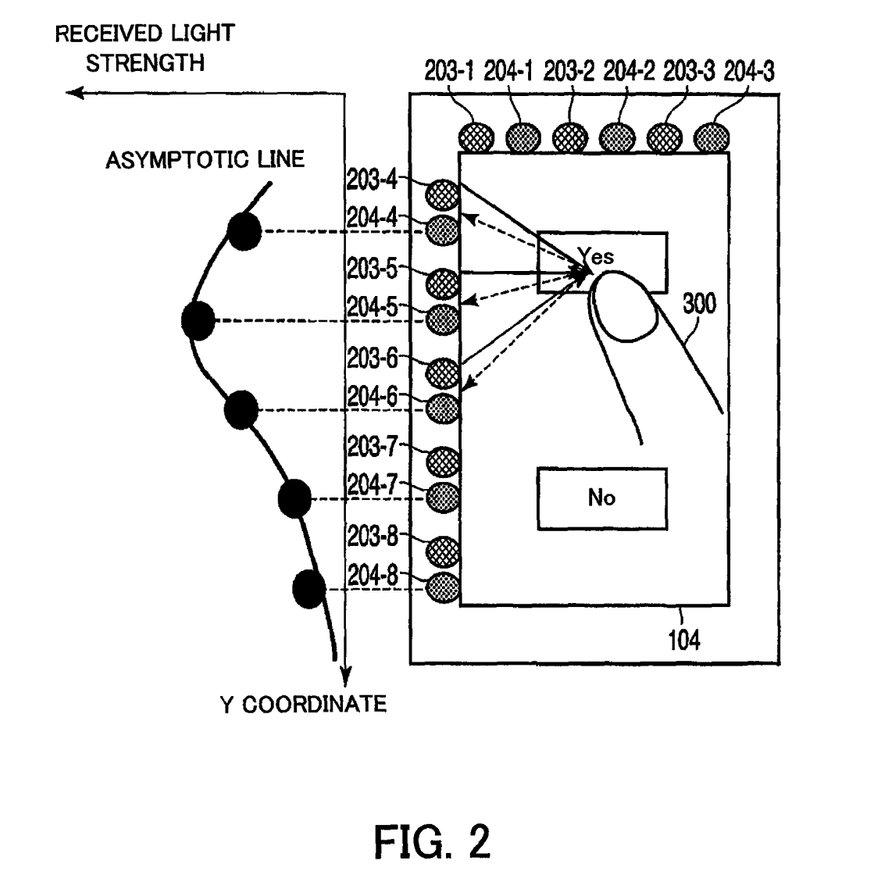
FIG. 2 is an illustration of a principle of a three-dimensional position detection using the input device of FIG. 1.

FIG. 2 shows an example of a principle of a three-dimensional position detection using the input device 200. Although, in FIG. 2, it is carrying out position detection in accordance with the reflected light method, it is also acceptable that the input device 200 carries out position detection in accordance with the transmitted light method.

In FIG. 2, multiple light emitting elements and multiple light receiving elements are disposed on an edge of the display unit 104 (hereinafter, referred to as an upper edge), and an edge (hereinafter, referred to as a left edge) perpendicular to the upper edge. More specifically, three light emitting elements 203-1, 203-2, and 203-3 are disposed on the upper edge, and three light receiving elements 204-1, 204-2, and 204-3 are disposed in proximity to each of them. Also, five light emitting elements 203-4, 203-5, 203-6, 203-7, and 203-8 are disposed on the left edge, and light receiving elements 204-4, 204-5, 204-6, 204-7, and 204-8 are disposed in proximity to each of them.

The input control unit 201, in order to detect the input position, supplies a driving power to the eight light emitting elements 203-1 to 203-8, via the light emission control unit 202. Each of the light emitting elements 203-1 to 203-8 to which the driving power is supplied radiates an inspection beam. One portion of the inspection beams radiated by each of the light emitting elements 203-1 to 203-8 (shown as bold line arrows in FIG. 2) is reflected by the object 300, and the reflected beams (shown as dashed arrows in FIG. 2) are received by the light receiving elements 204-1 to 204-8.

Since the inspection beams attenuate before reaching the object 300, the strength of the reflected beam which is radiated from the light emitting unit 203 the nearer to the object 300 to be the greater. Also, since the reflected beams attenuate before reaching the light receiving unit 204, the received light strength to be the greater the nearer the light receiving unit 204 is to the object 300. That is, a variation in the received light strength occurs among the multiple light receiving elements.

With the example of FIG. 2, it is possible to detect a coordinate of the object in a horizontal direction (an X axis direction) based on the light strength received by the light receiving elements 204-1 to 204-3, and to detect a coordinate of the object in a vertical direction (a Y axis direction) based on the light strength received by the light receiving elements 204-4 to 204-8. For example, in a case of detecting the Y coordinate of the object 300, as shown in FIG. 2, the received light strength in each of the light receiving elements 204-4 to 204-8 is plotted as a received light strength corresponding to a Y coordinate at which the relevant light receiving elements are disposed. Then, it is possible to derive an asymptotic line by performing a polynomial interpolation or the like on the plotted received light strengths, and detects a Y coordinate corresponding to an apex (maximum value) of the asymptotic line as the Y coordinate of the object 300. In a case of detecting the X coordinate of the object 300, it is sufficient to carry out the same kind of process as the Y coordinate on the received light strength in each of the light receiving elements 204-1 to 204-3.

Also, it is possible to detect a coordinate of the object 300 in a height direction (a Z axis direction) based on the received light strength at the X coordinate and/or the Y coordinate. In practice, since the detection accuracy of the height is inferior in comparison with the detection accuracy of the plan positions (that is, the X coordinate and Y coordinate), it is often the case that the height is expressed as a graduated classification, rather than as a specific coordinate. For example, to classify the Z coordinate of the object 300 in three stages—"touch", "hover", and "undetected",—the received light strength is compared with two large and small threshold values th1 and th2 (wherein it is taken that th1>th2). That is, it is possible to determine that the stage is "touch" if the received light strength is greater than the threshold value th1, to determine that the stage is "undetected" if the received light strength is less than the threshold value th2, and to determine that the stage is "hover" if the received light strength is between the threshold value th2 and threshold value th1.

Figure 3:
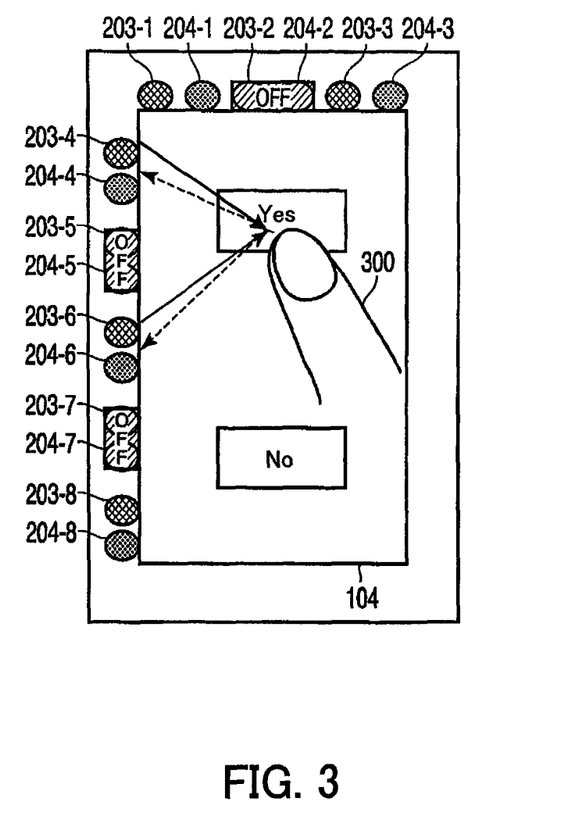
FIG. 3 is a diagram showing one example of turning on and off of a light emitting unit and light receiving unit in a case of making a detection accuracy of the input device of FIG. 1 low.

Herein, as shown in FIG. 3 for example, when one portion of the light emitting elements and light receiving elements (the light emitting elements 203-2, 203-5, and 203-7, and the light receiving elements 204-2, 204-5, and 204-7) is turned off by an operation of the light emission control unit 202 and light reception control unit 205, the detection accuracy of the input position declines because it is not possible to obtain the received light strength from the light receiving elements 204-2, 204-5, and 204-7, which are turned off. On the other hand, by turning off one portion of the light emitting elements and light receiving elements, power consumption is reduced. In this way, the input control unit 201 can essentially adjust the detection accuracy by switching between turning on and turning off of the light emitting elements and light receiving elements, via the light emission control unit 202 and light reception control unit 205.

Figure 4:
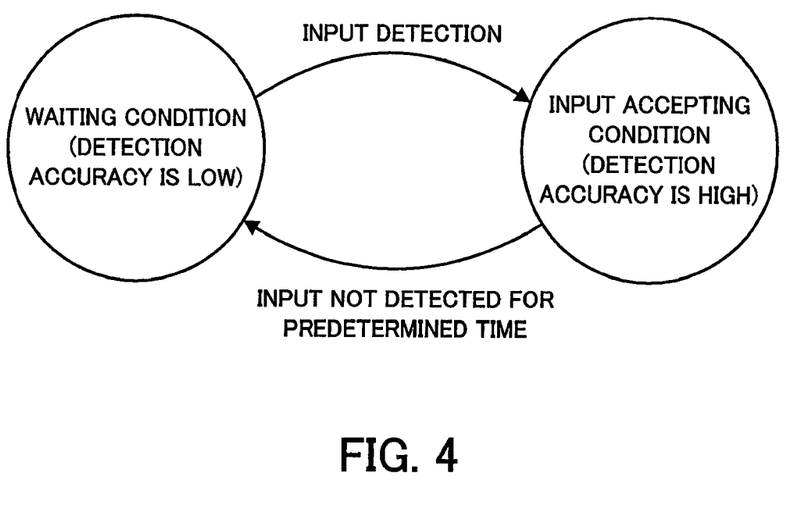
FIG. 4 is a state transition diagram showing one example of a transition of an operational condition of the input device of FIG. 1.

The input device 200 according to this embodiment adjusts the detection accuracy in accordance with a transition between two operational conditions, as shown in FIG. 4. When the input device 200 is in a waiting condition, the input control unit 201 sets the input position detection accuracy to be low. That is, the input control unit 201 turns off one portion of the light emitting elements and light receiving elements, via the light emission control unit 202 and light reception control unit 205. Herein, the waiting condition meaning a condition in which no input is detected for a predetermined time, and the required detection accuracy is comparatively low. While the input device 200 is in the waiting condition, it is acceptable that the display control unit 103 displays a so-called screen saver in the display unit 104. On the light reception control 205 detecting an input when the input device 200 is in the waiting condition, the input control unit 201 controls the input device 200 to transit to an input accepting condition. Herein, the input accepting condition means that a predetermined time has not been passed from the time when the user was detected, and the required detection accuracy is comparatively high.

When the input device 200 is in the input accepting condition, the input control unit 201 sets the input position detection accuracy to be high. Therefore, the input control unit 201 turns on at least one portion of the light emitting elements and light receiving elements, via the light emission control unit 202 and light reception control unit 205. That is, more light emitting elements and light receiving elements are on in the input accepting condition compared to in the waiting condition.

In the event that the light reception control unit 205 detects no input for a predetermined time when the input device 200 is in the input accepting condition, the input control unit 201 causes the operational condition of the input device 200 to transit to the waiting condition.

Figure 5:
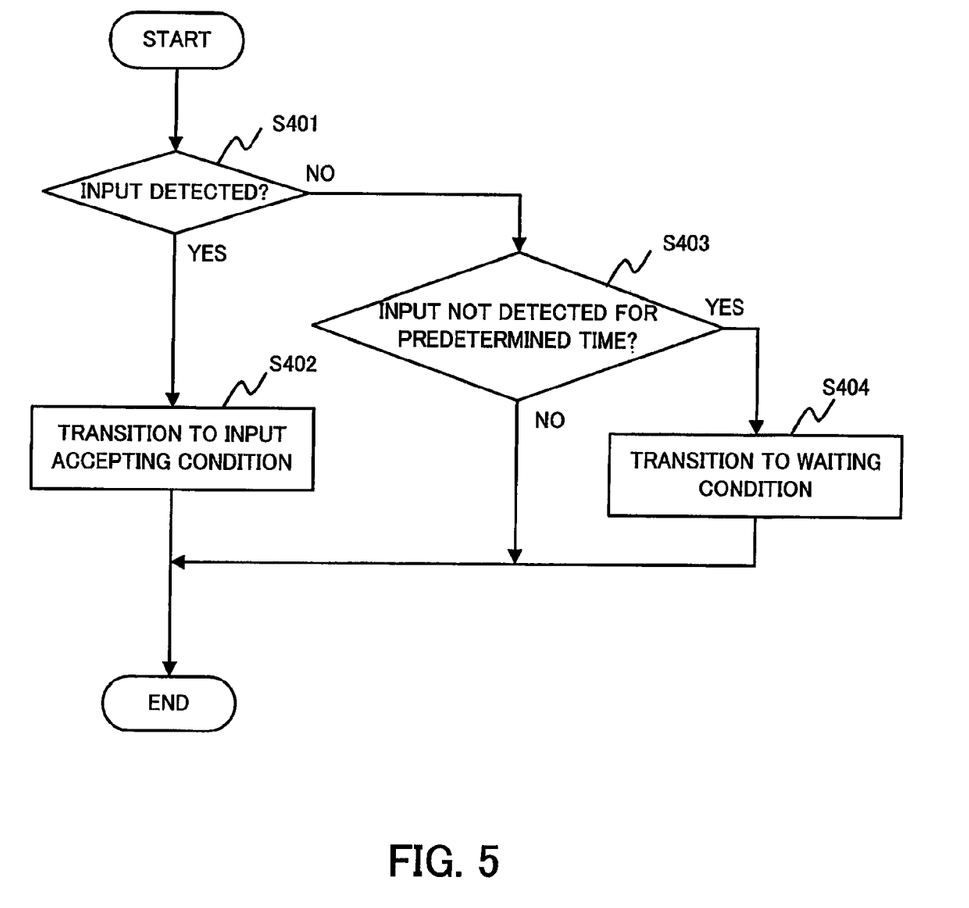
FIG. 5 is a flowchart corresponding to FIG. 4.

In order to realize the operational condition transition shown in FIG. 4, the input control unit 201 carries out, for example, the process shown in FIG. 5. The process as shown in FIG. 5 is carried out repeatedly in accordance with a predetermined cycle for detecting an input.

Firstly, the input control unit 201 attempts a detection of an input via the light emission control unit 202 and light reception control unit 205 (step S401). If an input is detected, the process proceeds to step S402, while if no input is detected, the process proceeds to step S403.

In step S402, the input control unit 201 controls the input device 200 to transit to the input accepting condition, and finishes the process. Specifically, the input control unit 201, if the input device 200 is in the waiting condition, turns on at least one portion of the light emitting elements and light receiving elements, via the light emission control unit 202 and light reception control unit 205, in order that the input position detection accuracy increases. Meanwhile, if the input device 200 is already in the input accepting condition, the input control unit 201 does not need to adjust the detection accuracy.

In step S403, the input control unit 201 determines whether or not a time for which no input is detected since the last input detection exceeds a predetermined time. For example, a value such as 15 minutes is appropriately set, at the design stage or by the user, as the predetermined time. If the time for which no input is detected since the last input detection exceeds the predetermined time, the process proceeds to step S404, while if this is not the case, the process finishes.

In step S404, the input control unit 201 causes the operational condition of the input device 200 to transit to the waiting condition, and finishes the process. Specifically, the input control unit 201, if the input device 200 is in the input accepting condition, turns off one portion of the light emitting elements and light receiving elements, via the light emission control unit 202 and light reception control unit 205, in order that the input position detection accuracy decreases. Meanwhile, if the input device 200 is already in the waiting condition, the input control unit 201 does not need to adjust the detection accuracy.

In the way heretofore described, the input device according to this embodiment, switching between turning on and turning off of the light emitting element and light receiving element in accordance with a transition of the operational condition, dynamically adjusts the input position detection accuracy. Consequently, according to the input device according to this embodiment, wasteful power consumption in the light emitting unit and light receiving unit is curbed.

Second Embodiment

The input device 200 according to the first embodiment dynamically adjusts the input position detection accuracy in accordance with a transition of the operational condition. The input device 200 according to a second embodiment of the invention differs from the input device according to the first embodiment in that it dynamically adjusts the input position detection accuracy in accordance with a transition of an input condition.

Firstly, a description will be given of a specific example of input conditions in this embodiment. As previously described, the input device 200 detects the three-dimensional position (input position) of the object 300 in relation to the display unit 104, and expresses the height in the three stages "touch", "hover", and "undetected". Also, the input device 200 according to this embodiment calculates a movement distance between the detected input position and an input position detected immediately before as an input position movement speed. In this embodiment, a combination of the detected input height and input position movement speed is specified as the input condition.

Figure 6:
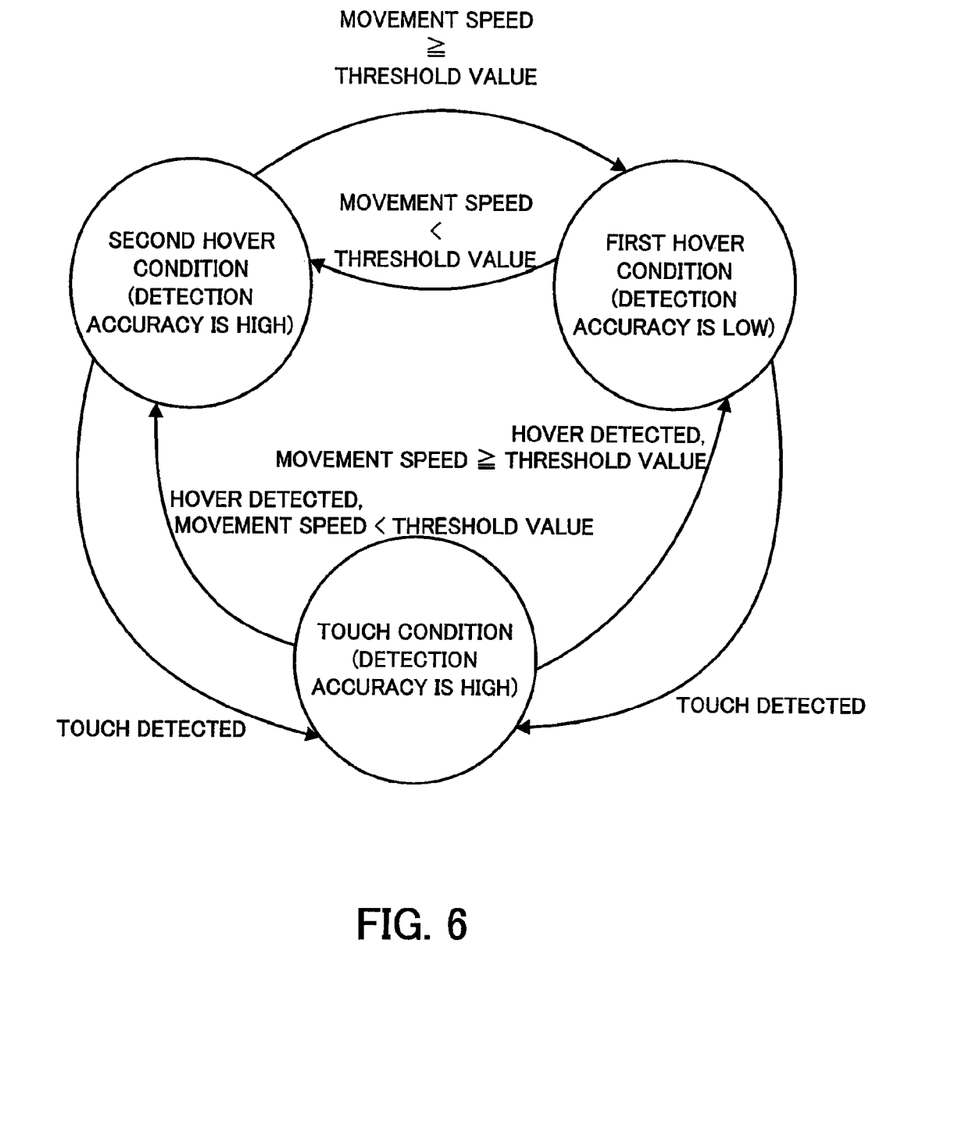
FIG. 6 is a state transition diagram showing one example of a transition of an input condition of an input device according to a second embodiment.

The input device 200 according to this embodiment adjusts the detection accuracy in accordance with a transition among three input conditions, as shown in FIG. 6. When the input condition is a first hover condition, the input control unit 201 sets the input position detection accuracy to be low. That is, the input control unit 201 turns off one portion of the light emitting elements and light receiving elements, via the light emission control unit 202 and light reception control unit 205. Herein, the first hover condition means a condition in which the detected input height is "hover", and also, the movement speed is greater than or equal to a threshold value. That is, the first hover condition meaning a condition in which the object 300 is moved swiftly while remaining suspended above the display unit 104, a situation is assumed wherein there is hesitation in the user's input, the targeted input position is far away, or the like, because of which the required detection accuracy is comparatively low.

When the input condition is the first hover condition, an input is detected of which the height is "hover", and also, the movement speed is less than the threshold value, the input control unit 201 causes the input condition to transit to a second hover condition. Herein, the second hover condition means a condition in which the detected input height is "hover", and also, the movement speed is less than the threshold value. That is, the second hover condition meaning that the movement speed is low in comparison with that of the first hover condition, a situation is assumed wherein the object 300 is stopped approximately directly above the targeted input position, because of which the required detection accuracy is comparatively high. Also, when the input condition is the first hover condition, an input is detected of which the height is assigned "touch", the input control unit 201 causes the input condition to transit to a touch condition. Herein, the touch condition means a condition in which the detected input height is assigned "touch". That is, the touch condition meaning a condition in which the object 300 is in contact with the display unit 104, a situation is assumed wherein the user has carried out an input toward the targeted input position through the object 300, because of which the required detection accuracy is comparatively high.

When the input condition is the second hover condition, the input control unit 201 sets the input position detection accuracy to be high. That is, the input control unit 201 turns on at least one portion of the light emitting elements and light receiving elements, via the light emission control unit 202 and light reception control unit 205. When the input condition is the second hover condition, an input is detected of which the height is assigned "hover", and also, the movement speed is greater than or equal to the threshold value, the input control unit 201 causes the input condition to transit to the first hover condition. Also, when the input condition is the second hover condition, an input is detected of which the height is assigned "touch", the input control unit 201 causes the input condition to transit to the touch condition.

When the input condition is the touch condition, the input control unit 201 sets the input position detection accuracy to be high. That is, the input control unit 201 turns on at least one portion of the light emitting elements and light receiving elements, via the light emission control unit 202 and light reception control unit 205. It is acceptable that the detection accuracy in the touch condition and the detection accuracy in the second hover condition are the same, and it is also acceptable to make the detection accuracy in the touch condition higher than the detection accuracy in the second hover condition, but in the following description, it will be taken that the two are equal. When the input condition is the touch condition, an input is detected of which the height is assigned "hover", and also, the movement speed is greater than or equal to the threshold value, the input control unit 201 causes the input condition to transit to the first hover condition. Also, when the input condition is the touch condition, an input is detected of which the height is assigned "hover", and also, the movement speed is less than the threshold value, the input control unit 201 causes the input condition to transit to the second hover condition.

Figure 7:
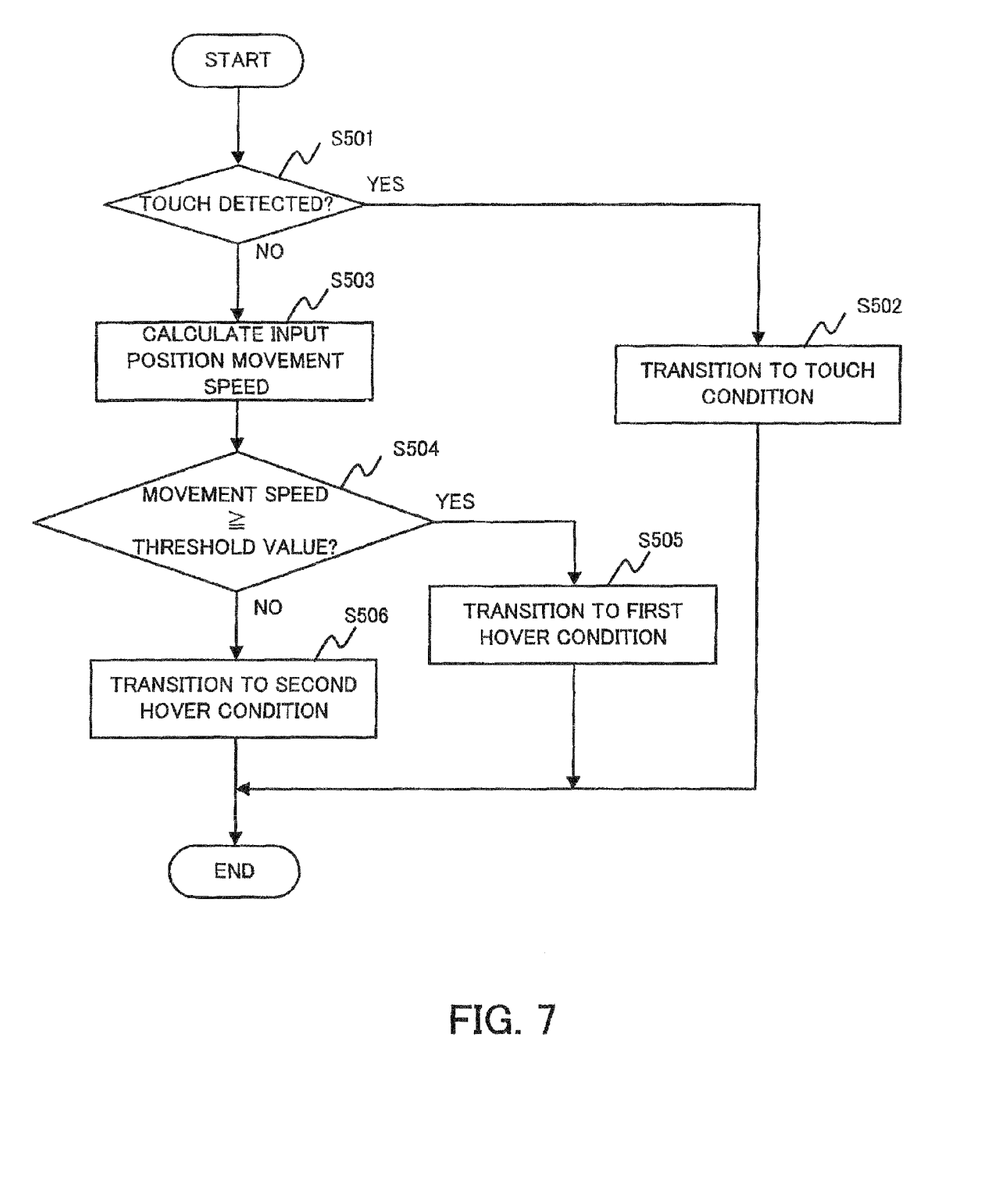
FIG. 7 is a flowchart corresponding to FIG. 6.

In order to realize the input condition transition shown in FIG. 6, the input control unit 201 carries out, for example, the process shown in FIG. 7. The process shown in FIG. 7 is carried out repeatedly in accordance with a predetermined cycle for detecting an input.

Firstly, the input control unit 201 confirms whether or not the height of a detected input is assigned "touch" (step S501). If the height of the detected input is assigned "touch", the process proceeds to step S502, while if the height is assigned "hover", the process proceeds to step S503.

In step S502, the input control unit 201 causes the input condition to transit to the touch condition, and finishes the process. Specifically, if the current input condition is the first hover condition, the input control unit 201 turns on at least one portion of the light emitting elements and light receiving elements, via the light emission control unit 202 and light reception control unit 205, in order that the input position detection accuracy increases. Meanwhile, if the current input condition is already the touch condition, or the second hover condition, the input control unit 201 does not need to adjust the detection accuracy.

In step S503, the input control unit 201 calculates movement speed of the input position. Specifically, the input control unit 201 calculates the movement distance between the input position detected the time before and the input position detected on this occasion as the movement speed. Next, the input control unit 201 compares the movement speed calculated in step S503 and the threshold value. If the movement speed is greater than or equal to the threshold value, the process proceeds to step S505, while if this is not the case, the process proceeds to step S506.

In step S505, the input control unit 201 controls the input condition to transit to the first hover condition, and finishes the process. Specifically, if the current input condition is the touch condition or second hover condition, the input control unit 201 turns off one portion of the light emitting elements and light receiving elements, via the light emission control unit 202 and light reception control unit 205, in order that the input position detection accuracy decreases. Meanwhile, if the current input condition is already the first hover condition, the input control unit 201 does not need to adjust the detection accuracy.

In step S506, the input control unit 201 causes the input condition to transit to the second hover condition, and finishes the process. Specifically, if the current input condition is the first hover condition, the input control unit 201 turns on at least one portion of the light emitting elements and light receiving elements, via the light emission control unit 202 and light reception control unit 205, in order that the input position detection accuracy increases. Meanwhile, if the current input condition is already the second hover condition, or the touch condition, the input control unit 201 does not need to adjust the detection accuracy.

That is, more light emitting elements and light receiving elements are on in the second hover condition or the touch condition compared to in the first hover condition.

In the way heretofore described, the input device according to this embodiment, switching between turning on and turning off of the light emitting element and light receiving element in accordance with a transition of the input condition, dynamically adjusts the input position detection accuracy. Consequently, according to the input device according to this embodiment, wasteful power consumption in the light emitting unit and light receiving unit is curbed.

Third Embodiment

The input device 200 according to a third embodiment of the invention carries out an input detection divided into two stages or more. In the following description, it will be taken that the input detection is carried out in two stages.

Figure 8A:
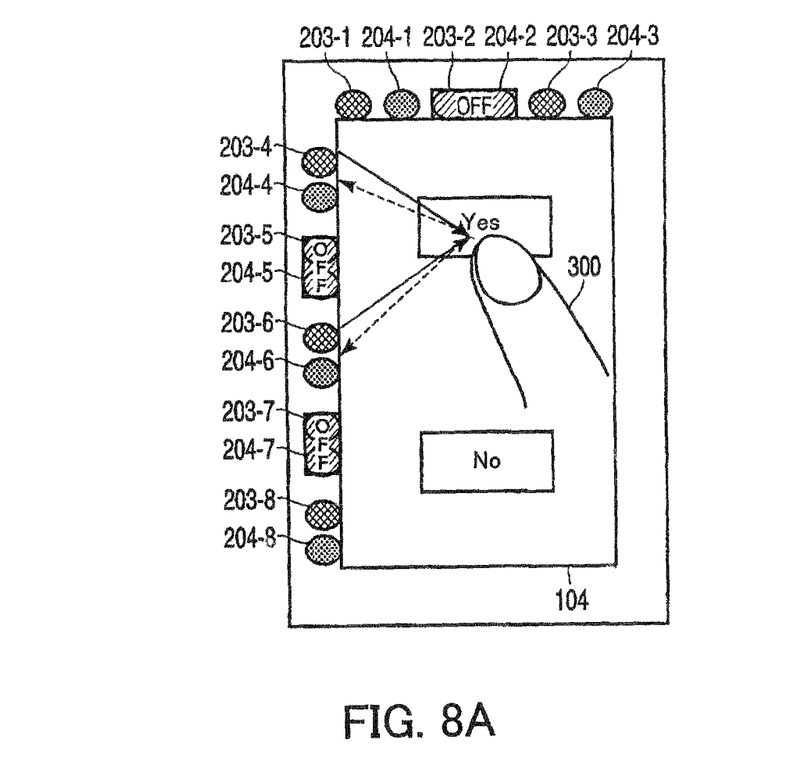
FIG. 8A is a diagram showing one example of turning on and off of a light emitting unit and light receiving unit in a case in which an input device according to a third embodiment is in a first detection stage.

Firstly, the input control unit 201 carries out a first detection with low detection accuracy. For example, the input detection unit 201 carries out a first stage detection. When the first stage detection is carried out, the input control unit 201 controls one portion of the light emitting elements and light receiving elements to turned off as shown in FIG. 8A via the light emission control unit 202 and light reception control unit 205.

Figure 8B:
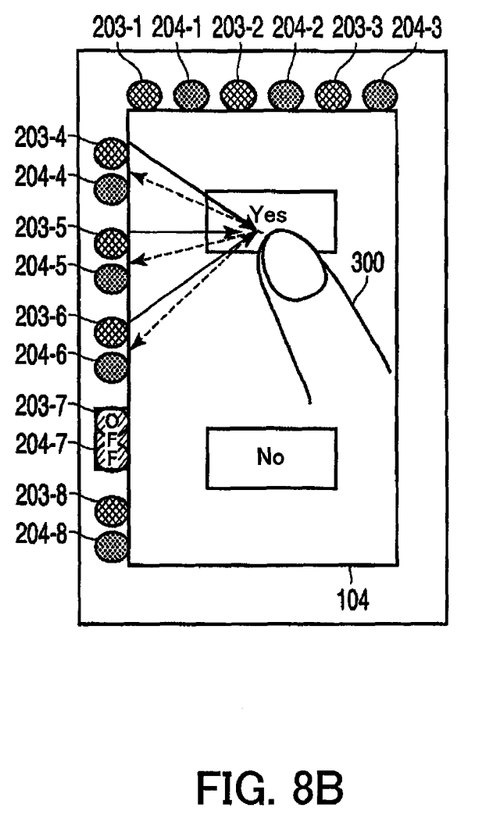
FIG. 8B is a diagram showing one example of turning on and off of the light emitting unit and light receiving unit in a case in which the input device according to the third embodiment is in a second detection stage.

Next, the input control unit 201, based on a first stage detection result, increases the detection accuracy in one area of the display unit 104, and carries out a second stage detection. Specifically, the input control unit 201 identifies a rough area in which the object 300 is positioning by the first stage detection, and increases the detection accuracy of the identified area to identify the position of the object 300 by the second stage detection. That is, turns on the light emitting elements and light receiving elements which strongly affect the detection accuracy of the identified area. To control the light emitting unit 203 and light receiving unit 204 based on the roughly identified area, the input control unit 201 stores a relationship of a plurality of areas, which are obtained by dividing the surface of the display unit 104, and one portion of the light emitting elements and light receiving elements which have a strong effect on the detection accuracy in each of the areas. For example, as shown in FIG. 8B, the input control unit 201 turns on the light emitting elements 203-2 and 203-5, and the light receiving elements 204-2 and 204-5, increasing the detection accuracy of the area in which the object 300 is positioned, and leaves the light emitting element 203-7 and light receiving element 204-7, which do not much affect the detection accuracy of the area, turned off.

In the way, the input device according to this embodiment, as well as shifting in stages from a rough detection to a fine detection, identifies the area in which to carry out the fine detection based on the result of the rough detection. That is, the input device according to this embodiment, by locally increasing the input position detection accuracy, can reduce power consumption while maintaining the necessary detection accuracy.

Fourth Embodiment

The input device 200 according to a fourth embodiment of the invention can set different detection accuracies between the horizontal direction and vertical direction. That is, the input control unit 201, to set the detection accuracy in the horizontal direction to be high and the detection accuracy in the vertical direction to be low, turns off one portion of the light emitting elements and light receiving elements which do not much affect the detection accuracy in the horizontal direction. Meanwhile, the input control unit 201, to set the detection accuracy in the vertical direction to be high and the detection accuracy in the horizontal direction to be low, turns off one portion of the light emitting elements and light receiving elements which do not much affect the detection accuracy in the vertical direction.

Figure 9:
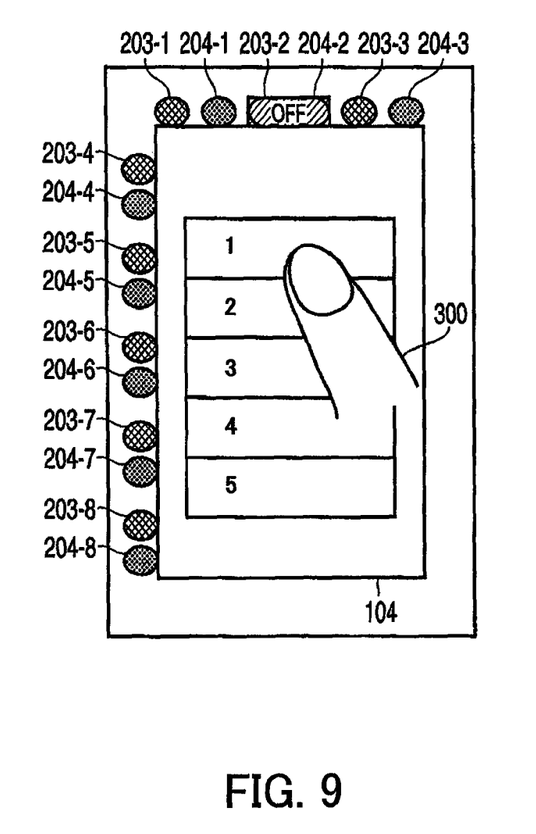
FIG. 9 is a diagram showing one example of turning on and off of a light emitting unit and light receiving unit in an input device according to a fourth embodiment.

For example, if UI elements (such as an icon, a menu, and a checkbox) are aligned in a vertical direction on the screen of the display unit 104 as shown in FIG. 9, it is acceptable that the detection accuracy in the horizontal direction is made lower than the detection accuracy in the vertical direction. Consequently, in FIG. 9, the input control unit 201 is reducing the power consumption by turning off the light emitting element 203-2 and light, receiving element 204-2, which do not much affect the detection accuracy in the vertical direction. Meanwhile, if the UI elements for carrying out the mutually differing inputs are aligned in a horizontal direction in the display unit 104, it is acceptable that the input control unit 201 turns off one portion of the light emitting elements and light receiving elements which do not much affect the detection accuracy in the horizontal direction.

In the way, the input device according to this embodiment can set differing detection accuracies in the horizontal direction and vertical direction. Consequently, according to the input device according to this embodiment, in a case in which it is acceptable that the detection accuracy in one direction is lower than the detection accuracy in the other direction, only the detection accuracy in the other direction is lowered, meaning that it is possible to reduce power consumption while maintaining the necessary detection accuracy.

Fifth Embodiment

The input device 200 according to a fifth embodiment of the invention can set the detection accuracy in one area of the display unit 104 to be higher than in other areas. That is, the input control unit 201, in a case of setting the detection accuracy in one area of the display unit 104 to be high, and setting the detection accuracy in the other areas to be low, turns off one portion of the light emitting elements and light receiving elements which do not much affect the detection accuracy in the one area.

Figure 10:
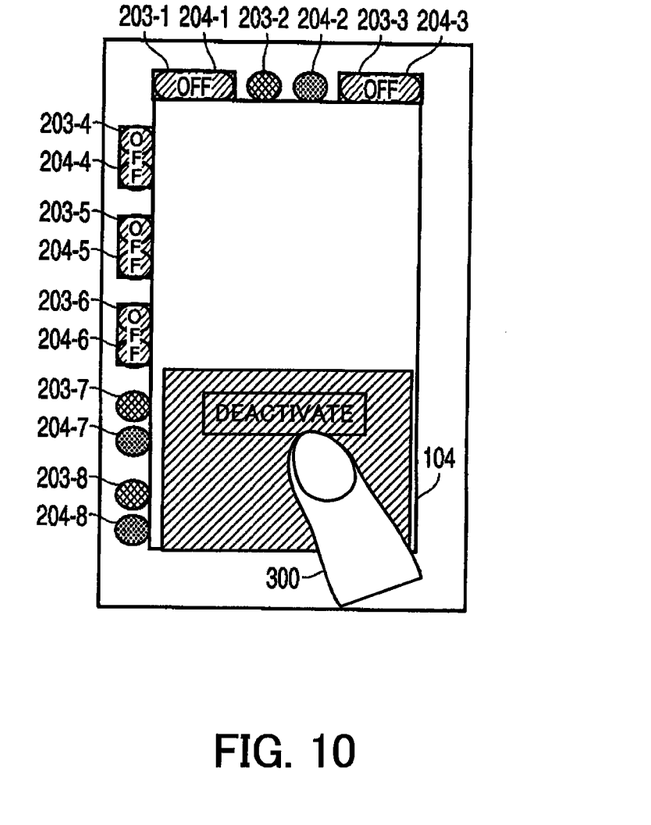
FIG. 10 is a diagram showing one example of turning on and off of a light emitting unit and light receiving unit in an input device according to a fifth embodiment.

For example, as shown in FIG. 10, there is a case the input device 200 being locked in which an area which can accept an input from the user is limited. In FIG. 10, input to the input device 200 being limited. When the input device 200 is locked, an input to an area other than a release button displayed in the display unit 104 is not accepted. That is, in FIG. 10, it is sufficient that the input device 200 can roughly detect an input in the shaded area. Consequently, in FIG. 10, the input control unit 201 is reducing the power consumption by turning off the light emitting elements 203-1, and 203-3 to 203-6, and the light receiving elements 204-1, and 204-3 to 204-6, which do not much affect the detection accuracy in the shaded area.

Herein, a specific method of setting the detection accuracy will be described. For example, the input control unit 201 compiles in advance a table in which are specified the light emitting elements and light receiving elements which have a strong effect on the detection accuracy in each of the multiple areas into which the display unit 104 is divided. Then, the input control unit 201, in a case in which an area which can accept an input from the user is limited, turns on the light emitting elements and light receiving elements which have a strong effect on the detection accuracy in an area, which duplicates the area which can accept the input, and turns off one portion of the other light emitting elements and light receiving elements. By using a table for the setting of the detection accuracy in this way, it is possible to efficiently set an appropriate detection accuracy.

In the way, the input device according to this embodiment can set a locally high detection accuracy. Consequently, according to the input device according to this embodiment, in a case in which the area which can accept an input from the user is limited, only the detection accuracy in the relevant area is raised, meaning that it is possible to reduce power consumption while maintaining the necessary detection accuracy.

The invention not being limited to each of the heretofore described embodiments as it is, it can be embodied modifying a component without delimiting from the scope of the invention. Also, various inventions can be formed by appropriately combining the multiple components disclosed in each of the heretofore described embodiments. Also, for example, a configuration can also be considered wherein some components are deleted from all the components shown in each embodiment. Furthermore, it is also acceptable to appropriately combine components described in differing embodiments.

According to an embodiment of the invention, it is possible to provide an input device which can dynamically adjust the input position detection accuracy.

What is claimed is:

1. An input device, comprising:
   a light emitting unit including multiple light emitting elements disposed on the periphery of an input area, said light emitting elements emit an inspection beam;
   a light receiving unit including multiple light receiving elements disposed on the periphery of the input area, said light receiving elements receive the inspection beam;
   a detecting unit to detect a position of an object in relation to the input area based on the inspection beam received by the light receiving unit; and
   a control unit to control at least one of the light emitting elements and the light receiving elements to turn on or off based on the detection accuracy which is required according to a height of the position of the object detected by the detecting unit.

2. The input device according to the claim 1, further comprising:
   a timer to count elapsed time from the last detection of the object position; and
   wherein the control unit controls at least one of the light emitting elements and the light receiving elements to turn off when the elapsed time exceeds a predetermined time.

3. The input device according to the claim 1, further comprising:
   a display unit displays information;
   a timer to count elapsed time from the since the last detection of the object position; and
   wherein the input area is the surface of the display unit and the control unit controls (i) at least one of the light emitting elements and the light receiving elements to turn off and (ii) the display unit to display a screen-saver when the elapsed time exceeds a predetermined time.

4. The input device according to the claim 3, wherein the control unit controls (i) at least one of the light emitting elements and the light receiving elements, which are turned off, to turn on and (ii) the display unit to display information when the detecting unit detects a position of an object while the display unit displays a screen-saver.

5. The input device according to the claim 1,
   wherein the control unit controls at least one of the light emitting unit and the light receiving unit to turn off some of the elements when a movement speed of the detected position of the object exceeds a predetermined speed.

6. The input device according to the claim 1,
   wherein the detecting unit detects the position of the object in two stages and the control unit controls at least one of the light emitting unit to turn off some of the elements while the detecting unit detects the position in the first stage, and said control unit controls to turn on at least one of the elements, which are turned off in the first stage while the detecting unit detects the position in the second stage.

7. The input device according to the claim 1, further comprising:
   a display unit displays characters or images which can be operated based on the position of the object detected by the detecting unit;
   wherein the input area is included in the area on the surface of the display unit and the control unit controls at least one of the light emitting unit and the light receiving unit to turn off according to the displayed characters or images.

8. The input device according to the claim 1, further comprising:
   a display unit displays characters or images which can be operated based on the position of the object detected by the detecting unit; and
   wherein the control unit controls at least one of the light emitting unit and the light receiving unit to turn off some of the elements disposed in a first direction, when the display unit displays the characters or images which are arranged in a second direction, said second direction is orthogonal to the first direction.

9. The input device according to the claim 1, further comprising:
   a display unit displays characters or images which can be operated based on the position of the object detected by the detecting unit; and
   wherein the input area is included in the area on the surface of the display unit and the control unit controls the light emitting unit turns off at least one of the light emitting elements which emits the inspection beam to an area where no characters or images to be operated are displayed.

10. The input device according to the claim 1, further comprising:
   a display unit displays characters or images which can be operated based on the position of the object detected by the detecting unit; and
   wherein the input area is included in the area on the surface of the display unit and the control unit controls the light receiving unit turns off at least one of the light receiving elements which receives the inspection beam from an area where no characters or images to be operated are displayed.

11. A mobile terminal, comprising:
   a display means for displaying information;
   a light emitting means for radiating an inspection beam;
   a light receiving means for receiving the inspection beam;
   detecting means for detecting a three-dimensional position of an object in relation to the display means based on strength of inspection beam received by the light receiving means; and
   controlling means for controlling at least one of the light emitting means and the light receiving means to turn on or off based on the detection accuracy which is required according to a height of the position of the object detected by the detecting means.

12. The mobile terminal according to the claim 11, further comprising:
   a time counting means for counting elapsed time from the since the last detection of the object position; and
   wherein the controlling means controls at least one of the light emitting means and the light receiving means to turn off when the elapsed time exceeds a predetermined time.

13. The mobile terminal according to the claim 11, further comprising:
   a time counting means for counting elapsed time from the since the last detection of the object position; and
   wherein the controlling means controls (i) at least one of the light emitting means and the light receiving means to turn off and (ii) the display means to change the output display on the screen when the elapsed time exceeds a predetermined time.

14. The mobile terminal according to the claim 11, wherein the controlling means controls at least one of the light emitting means and the light receiving means to turn off when a movement speed of the detected position of the object exceeds a predetermined speed.

15. The mobile terminal according to the claim 11,
   wherein the detecting means detects the position of the object in two stages; and
   the controlling means controls at least one of the light emitting means to turn off while the detecting means detects the position in the first stage, and said controlling means controls to turn on at least one of the light emitting means and light receiving means, which is turned off in the first stage while the detecting means detects the position in the second stage.

16. The mobile terminal according to the claim 11,
   wherein the display means displays characters or images which can be operated based on the position of the object detected by the detecting means;
   the controlling means controls at least one of the light emitting means and the light receiving means to turn off according to the placement of the displayed characters or images.

17. The mobile terminal according to the claim 11,
   wherein the display means displays characters or images which can be operated based on the position of the object detected by the detecting means;
   the controlling means controls at least one of the light emitting means and the light receiving means disposed in a first direction to turn off, when the display means displays the characters or images which are arranged in a second direction, said second direction is orthogonal to the first direction.

18. The mobile terminal according to the claim 11, further comprising:
   a storing means for storing the relationship between each of the light emitting unit and divided screen areas of the display means;
   wherein the display means displays to accept a user input based on the position of the object detected by the detecting means;
   the controlling means controls the light emitting means turns off which is related to the area in which user input is limited.

19. The mobile terminal according to the claim 11, further comprising:
   a storing means to store the relationship between each of the light receiving means and divided screen areas of the display means;
   wherein the display means displays to accept a user input based on the position of the object detected by the detecting means;
   the control means controls the light receiving means turns off which is related to the area in which user input is limited.

* * * * *